A. R. CLAYTON.
REVOLVING RAKE.
APPLICATION FILED FEB. 26, 1914. RENEWED FEB. 24, 1917.
1,222,526.
Patented Apr. 10, 1917.
2 SHEETS—SHEET 1.
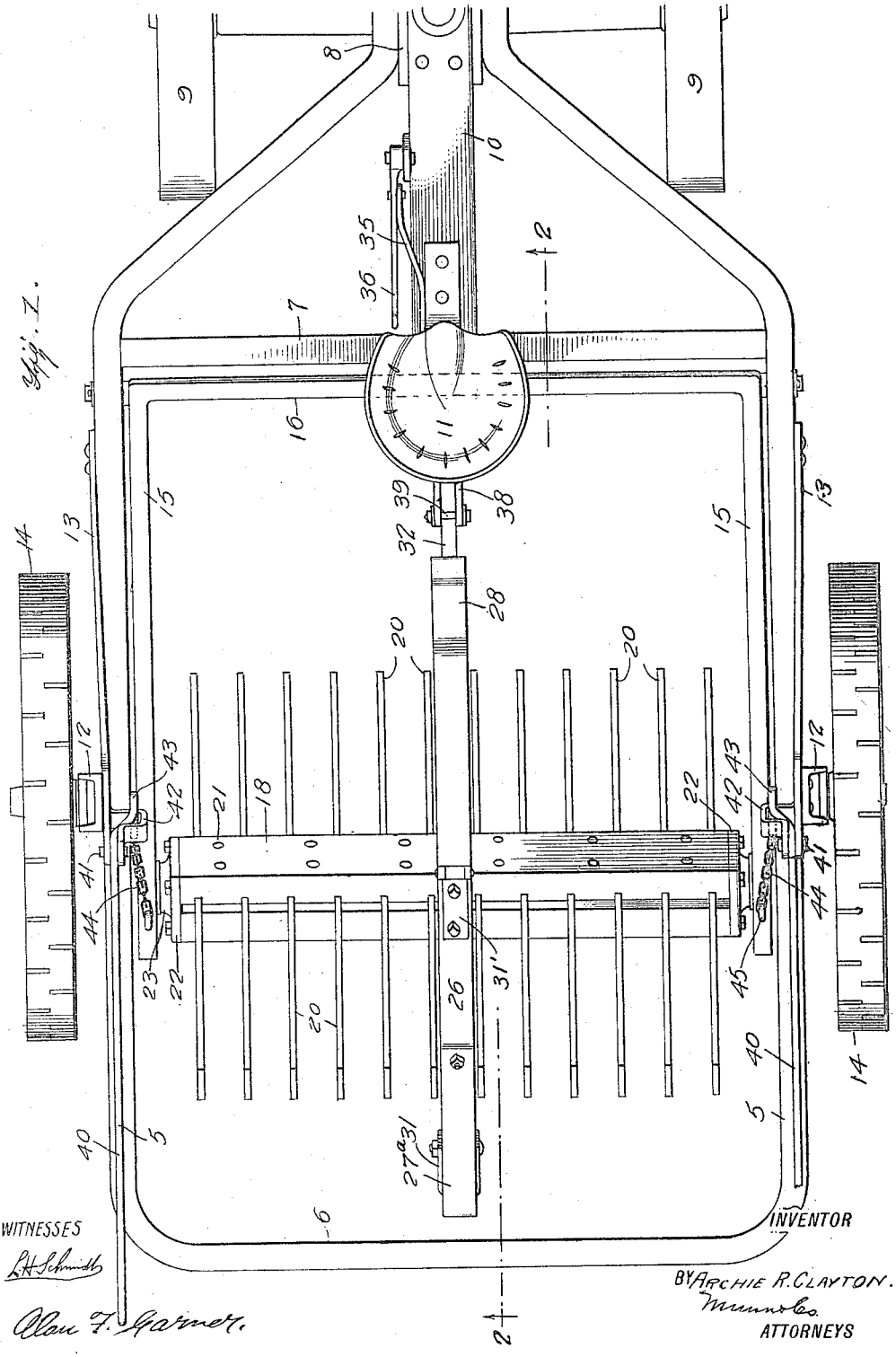
WITNESSES
INVENTOR
BY ARCHIE R. CLAYTON.
ATTORNEYS

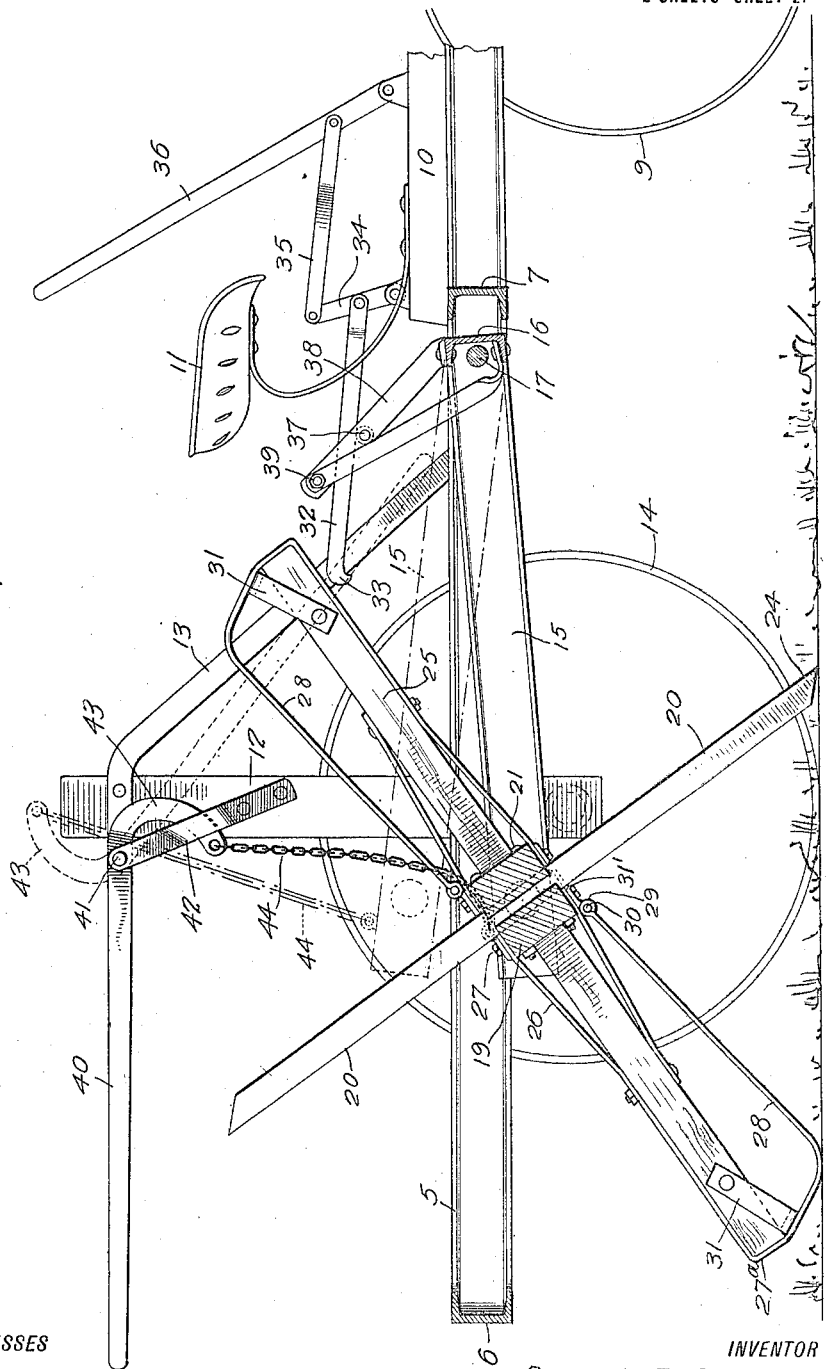

UNITED STATES PATENT OFFICE.

ARCHIE R. CLAYTON, OF NORTH FORK, NEVADA.

REVOLVING RAKE.

1,222,526.  Specification of Letters Patent.  Patented Apr. 10, 1917.

Application filed February 26, 1914, Serial No. 821,167. Renewed February 24, 1917. Serial No. 150,818.

*To all whom it may concern:*

Be it known that I, ARCHIE R. CLAYTON, a citizen of the United States, and a resident of North Fork, in the county of Elko and State of Nevada, have invented a new and useful Improvement in Revolving Rakes, of which the following is a specification.

This invention relates to agricultural implements, and more particularly to rakes.

One of the principal objects of the invention is to provide a rake for gathering sagebrush and similar undergrowth, said rake embodying a wheel supported frame, a second frame movable with relation to the first and carrying teeth, means to adjust and maintain the teeth in spaced relation with the ground and means for elevating the second frame.

A further object of the invention is to provide an improved rake of the class described, which will be simple, durable, efficient in operation, and inexpensive to manufacture.

With these and other objects in view which will become apparent as the description proceeds, the invention resides in the construction, combination and arrangement of parts hereinafter more fully described and claimed, and illustrated in the accompanying drawing in which like characters of reference indicate like parts throughout the figures, of which—

Figure 1 represents a top plan view of a rake constructed according to my invention, and Fig. 2 represents a vertical, longitudinal sectional view taken on the plane indicated by the broken line 2—2 of Fig. 1.

Referring more particularly to the drawing, the rake provides a main frame comprising side bars 5, a rear end bar 6 and a front end bar 7, said side bars extended beyond the front end bar and converging, and connected at their ends to a bumper 8 carrying an axle on which the guide wheels 9 are pivoted. Connecting the bumper with the front end bar 7 is a platform 10 on which the driver's seat 11 is secured.

Side bars 5 are each provided with an upright 12 connected at its upper end to a brace 13 which is in turn secured to the side bar forwardly of the upright. Uprights 12 extend somewhat below the main frame and are provided with stub axles carrying ground wheels 14.

A secondary frame comprising side bars 15 and a front bar 16 is disposed within the main frame, and is pivoted thereto by means of a shaft 17 extending transversely of the main frame near the front cross bar 7, said shaft 17 extending through the side bars 15 of the secondary frame near their forward ends.

A tooth carrying shaft 18 is pivoted at its ends in the rear ends of the side bars 15 of the secondary frame, and said shaft comprising a pair of heavy timbers 19 which are oblong in cross section, and which are provided on their opposing faces with registering transversely disposed grooves, in which are disposed a plurality of bars 20 which form the rake teeth, said bars being engaged at their central portions between the timbers 19 and projecting on each side thereof at right angles thereto, said timbers being secured together by means of bolts 21, for securely clamping the arms 20 in place. To the ends of the beams 19 are bolted plates 22 carrying stub axles 23 which extend through the side bars of the secondary frame for rotatably supporting the shaft 18 thereon.

The ends of the teeth are beveled off as at 24 so that when the teeth are in the position shown in Fig. 2, the ends of the teeth will be substantially parallel with the ground. When in this position it is noted that the teeth are disposed at an angle to the ground, and in order to maintain them in that position, the tooth carrying shaft is provided centrally and at right angles to the teeth with a beam 25 extending through the beams 19 and braced thereto by means of straps 26 secured at their outer ends centrally of the section of the beam 25 extending on each side of the shaft and secured at their inner ends by means of bolts 27 to the timbers 19. One of the straps 26 on each of the sections of beam 25 is extended around the end of the section as at 27ª, and is then bulged outwardly as at 28 and has its end provided with an eye 29 through which extends a pin 30 carried by a plate 31' secured to one of the beams 19, for securing that end of the strap 26 to the beam. Yokes 31 are secured to each end of beam 25 and brace the bulged portions 28 of the strap.

By this arrangement the beam 25 is fixed with oppositely disposed runners, one of which is adapted to be against the ground, as shown in Fig. 2, when one set of teeth is adjacent the ground, and the other runner adapted to be against the ground when the opposite set of teeth is adjacent the same.

It is evident that when one of the runners is in contact with the ground, by swinging the opposite end of timber 25 rearwardly or forwardly, the teeth adjacent the ground will be raised or lowered, and in order to accomplish this movement and to maintain the beam in fixed relation at will, there is provided a rod 32 enlarged at its rear end as at 33, and connected at its forward end by means of a lever 34 and link 35 with a lever 36, operable from the driver's seat, and said rod is movable on a roller 37 carried by a frame 38 secured to the front bar 16 of the secondary frame. The frame comprehends two portions each comprising a pair of braces secured at their upper ends by means of a bolt 39 which bolt also secures the side portions together, said braces secured at their lower ends one to the upper portion of the front bar of the secondary frame and one to the lower portion thereof. The roller 37 is positioned between the members of the frame. The rear end of rod 32, as indicated in Fig. 2, abuts against the beam 25 at the end thereof opposite the ground end, so that as the rake travels along gathering the sagebrush or similar undergrowths, upon the rake teeth, rotary motion to which the teeth carrying shaft would tend is prohibited and the teeth are maintained at a predetermined relation with the ground. At the same time by reason of the secondary frame being movable with relation to the first, the frame will move up or down as humps or hollows in the ground are encountered, so that the teeth will follow the contour of the ground.

When the rake is not in use the secondary frame may be raised by means of a lever 40 pivoted at 41 to the rear end of each brace 13, the pin being partially supported by brace 42 which is connected to the upright 12, and lever 40 is provided with a hook portion 43 carrying a chain 44 which is connected by means of an eye 45 to one of the side bars 15.

It will be understood that there is a lever 40 supported by each of the uprights so that support for both bars of the secondary frame is provided, as the same are raised.

Although I have described the preferred embodiment of my invention I may desire to make such changes in the construction, combination and arrangement of parts as do not depart from the spirit of the invention and the scope of the appended claims.

I claim:

1. A device of the class described comprising a wheel supported main frame, a secondary frame pivoted within the same, a shaft rotatably carried by the secondary frame, rake teeth carried by the said shaft, said teeth extending on both sides of said shaft and having their ends beveled to present substantially parallel end surfaces to the ground, a beam carried by said shaft and extended at right angles thereto and to said teeth, straps carried by said beam, said straps comprising runners, a rod, a frame slidably supporting said rod, a lever for operating said rod, said rod adapted to engage one end of said beam, when the opposite end thereof is adjacent the ground, for holding said teeth in spaced relation with the ground, uprights carried by said main frame, braces supporting said uprights, levers pivoted to said braces and chains connecting said levers with said secondary frame for raising or lowering the latter.

2. A device of the class described comprising a wheel supported frame, a secondary frame pivoted thereon, a tooth carrying shaft pivoted in said secondary frame, said shaft comprising a pair of timbers provided with registering transversely disposed grooves, arms positioned centrally in said grooves and extending to each side of said timbers, for forming the rake teeth, said timbers being secured together for securing said arms in place, and a beam extending through said timbers at right angles thereto, and to said arms, straps for bracing the portion of said beams extending on each side of said timbers to said timbers, one of the brace straps of each section of the beam being extended around the end of the beam and then bulged outwardly therefrom to form runners, said runners connected to said timbers, and yokes connected to the sections of said beam adapted to brace said runners.

3. A rake including a rake head, said rake head comprising timbers, rake teeth carried thereby, a beam carried by the timbers and extending on opposite sides thereof, straps connecting the beam extensions with said timbers, certain of said straps being extended around the ends of the beam and bulged outward to form runners, and means for bracing the runners.

ARCHIE R. CLAYTON.

Witnesses:
CHARLES B. HENDERSON,
J. L. DARTT.

Copies of this patent may be obtained for five cents each, by addressing the "Commissioner of Patents, Washington, D. C."